(12) United States Patent
Thibault et al.

(10) Patent No.: US 7,885,371 B2
(45) Date of Patent: Feb. 8, 2011

(54) METHOD AND SYSTEM FOR IMAGE RECONSTRUCTION

(75) Inventors: Jean-Baptiste Thibault, Milwaukee, WI (US); Charles Addison Bouman, West Lafayette, IN (US); Jeffrey Allen Fessler, Ann Arbor, MI (US); Ken David Sauer, South Bend, IN (US)

(73) Assignees: General Electric Company, Schenectady, NY (US); Perdue Research Foundation, West Lafayette, IN (US); The University of Notre Dame du Lac, Notre Dame, IN (US); The Regents of the University of Michigan, Ann Arbor, MI (US)

( * ) Notice: Subject to any disclaimer, the term of this patent is extended or adjusted under 35 U.S.C. 154(b) by 135 days.

(21) Appl. No.: 12/199,833

(22) Filed: Aug. 28, 2008

(65) Prior Publication Data

US 2010/0054394 A1    Mar. 4, 2010

(51) Int. Cl.
*A61B 6/00* (2006.01)
(52) U.S. Cl. ......................................................... 378/4
(58) Field of Classification Search ..................... 378/4, 378/8
See application file for complete search history.

(56) References Cited

U.S. PATENT DOCUMENTS

| | | | |
|---|---|---|---|
| 5,053,958 A * | 10/1991 | Tam ................................ | 378/4 |
| 5,909,476 A * | 6/1999 | Cheng et al. ................... | 378/4 |
| 6,507,633 B1 * | 1/2003 | Elbakri et al. .................. | 378/8 |
| 6,768,782 B1 | 7/2004 | Hsieh et al. | |
| 6,850,585 B2 * | 2/2005 | Hsieh et al. ..................... | 378/4 |
| 6,907,102 B1 | 6/2005 | Sauer et al. | |
| 7,519,143 B2 * | 4/2009 | Debasish et al. ............... | 378/7 |
| 2003/0156684 A1 * | 8/2003 | Fessler ........................ | 378/210 |
| 2006/0062443 A1 * | 3/2006 | Basu et al. .................. | 382/131 |
| 2006/0072801 A1 * | 4/2006 | Bernard Deman et al. .. | 382/131 |

OTHER PUBLICATIONS

Jean-Baptiste Thibault, Ken Sauer, Charles Bouman, and Jiang Hsieh, "A Three-Dimensional Statistical Approach to Improve Image Quality for Multi Slice Helical CT," Medical Physics, to appear, Nov. 2007.
Jean-Baptiste Thibault, Ken Sauer, Charles Bouman, and Jiang Hsieh, "Three-dimensional Statistical Modeling for Image Quality Improvements in Multi-Slice Helical CT," International Conference on Fully 3D Reconstruction in Radiology and Nuclear Medicine, Salt Lake City, Utah, USA Jul. 6-9, 2005.

(Continued)

*Primary Examiner*—Edward J Glick
*Assistant Examiner*—Alexander H Taningco
(74) *Attorney, Agent, or Firm*—Cantor Colburn LLP

(57) ABSTRACT

A method and system for image reconstruction of data acquired by a device such as computed tomography is provided. The method and system use a multi-stage statistical iterative reconstruction techniques to provide a three dimensional representation of the scanned object. In one embodiment, the first stage uses a projection-based reconstruction technique, such as Ordered Subset (OS) to converge on a solution for low frequency portion of the image. A subsequent stage uses a voxel-based reconstruction technique, such as Iterative Coordinate Descent (ICD), to converge on a solution for high frequency portions of the image. Systems and methods for reconstructing images from incomplete or partial projection data is also provided.

26 Claims, 7 Drawing Sheets

OTHER PUBLICATIONS

Jean-Baptiste Thibault, Ken Sauer, Charles Bouman, and Jiang Hsieh, "High Quality Iterative Image Reconstruction for Multislice Helical CT" Proceedings of the Fully 3-D Conference, Jun. 29-Jul. 4, 2003.

J.-B., Thibault, Z. Yu, C. Bouman, K. Sauer, J. Hsieh, "Method and System for Iterative Reconstruction", GE patent docket #217378, filed with the USPTO Nov. 16, 2006, U.S. Appl. No. 11/561,114.

C. A. Bouman and K. Sauer, "A Unified Approach to Statistical Tomography using Coordinate Descent Optimization," IEEE Trans. on Image Processing, vol. 5, No. 3, pp. 480-492, Mar. 1996.

J.-B. Thibault, Bruno De Man, Samit Basu, Z. Yu, C. Bouman, K. Sauer, J. Hsieh, "Method and System for Iterative Reconstruction", GE patent docket #217378, filed with the USPTO Nov. 17, 2006, U.S. Appl. No. 11/561114.

"A Local Update Strategy for Iterative Reconstruction from Projections", K. Sauer and C. Bouman, IEEE Transactions on Signal Processing, vol. 41, No. 2, pp. 534-548, Feb. 1993.

"Accelerated Image Reconstruction Using Ordered Subsets of Projection Data", H. Hudson and R. Larkin, IEEE Transactions on Medical Imaging, col. 13, No. 4, pp. 601-609, Dec. 1994.

"Simultaneous Transmission/Emission Myocardial Perfusion Tomography Diagnostic Accuracy of Attenuation-Corrected 99mTc-SestamibiSingle-Photon Emission Computed Tomography", Circulation. 1996;93:463-473., E Ficaro, J. Fessler, P. Shreve, J. Kritzman, P. Rose, J. Corbett; Department of Internal Medicine, Division of Nuclear Medicine, University of Michigan Medical Center (Ann Arbor); American Heart Association, 1996.

"Fast Hybrid Algorithms for PET Image Reconstruction", Q. Li, S. Ahn, R. Leahy, 2005 IEEE Nuclear Science Symposium Conference Record, pp. 1851-1855, IEEE 2005.

"A study of four minimization approaches for iterative reconstruction in X-ray CT", B. De Man, S. Basu, J. Thibault, J. Hsieh, J. Fessler, C. Bouman, K. Sauer, 2005 IEEE Nuclear Science Symposium Conference Record, pp. 2708-2710, IEEE 2005.

* cited by examiner

METHOD AND SYSTEM FOR IMAGE RECONSTRUCTION

FIELD OF THE INVENTION

The disclosure relates generally to imaging systems and particularly to systems and methods of reconstructing an image using multiple techniques.

BACKGROUND OF THE INVENTION

A computed tomography (CT) imaging system typically includes an x-ray source that projects fan- or cone-shaped x-ray beams through an object being imaged, such as a patient, to an array of radiation detectors. The beam is collimated to lie within an X-Y plane, or a set of such planes generally referred to as the "imaging planes." Intensity of radiation from the beam received at the detector array depends on attenuation of the x-ray beam by the object. Attenuation measurements from each detector are acquired separately to produce a transmission profile.

The x-ray source and the detector array are rotated within a gantry and around the object to be imaged so that a projection angle at which the x-ray beam intersects the object constantly changes. A group of x-ray attenuation measurements (such as integral projection data from the detector array at one gantry angle) is referred to as a "view". A "scan" of the object comprises a set of views made at varying projection angles, during one revolution of the x-ray source and detector array.

In an axial scan, the projection data is processed to construct an image that corresponds to one or more two-dimensional slices taken through the object. To form these slices, iterative reconstruction of a full field of view may be performed to increase image quality. Iterative reconstruction refers to a method that forms an image by repeatedly adjusting an existing estimate according to the quality of a match between measured data and simulated measurements from a current estimate of the image. The quality of the match may also be affected by consideration of the characteristics of the image alone, such as its smoothness and/or satisfaction of a pre-established model. Multiple iterations are performed to create a resulting reconstructed image that approximately matches the acquired projection data. A full set of reconstructed images is referred to as a 3-D reconstruction, since the set is formed into a three dimensional representation of the object with each image pixel or picture element corresponding to a single voxel or volume element in the 3-D reconstruction.

To reduce the total scan time required for multiple slices, a "helical" scan may be performed. Helical scan techniques allow for large volumes of the object to be scanned at a quicker rate using one or more photon sources. To perform a "helical" scan, the patient is moved along the z-axis, the axis about which the gantry rotates, synchronously with the rotation of the gantry, while data for a prescribed number of slices are acquired. Such a system generates a single helix from a fan beam helical scan. The helix mapped out by the fan beam yields projection data from which images in each prescribed slice may be reconstructed. In addition to reducing scan time, helical scanning provides other advantages such as better use of injected contrast, improved image reconstruction at arbitrary locations, and better three-dimensional images.

Traditionally, direct analytical algorithms, such as the Filtered Back-Projection (FBP) algorithm, have been used to reconstruct images from CT data. Iterative techniques, such as the Maximum A Posteriori Iterative Coordinate Descent (MAP-ICD) algorithm, have also been recently considered for reconstruction of volumetric CT data to provide means to improve general image quality over conventional techniques. It has been demonstrated that reduced noise, enhanced resolution, better low contrast performance, and reduced artifacts, can all be achieved with iterative reconstruction of clinical images. One important family of iterative algorithms works by optimizing a cost function formed of a data fit term and a penalization term. The data fit term describes a model wherein synthesized projections from an image estimate must match the acquired projection measurements, and may include a statistical weighting to apply different degrees of confidence to each datum depending on its noise characteristics. The penalization term typically enforces a smoothness constraint on the reconstructed images, and may treat differently homogeneous regions and regions with a large local gradient such as edges and organ boundaries. An iterative algorithm is applied to iteratively refine an image estimate from a set of initial conditions so as to minimize the resulting global cost function. When the minimum of the cost function has been achieved, the iterative algorithm has converged to the solution. For multi-slice CT data, the solution is a three-dimensional volume of image estimates that best matches the acquired data based on the model described in the cost function.

Several algorithms have been developed for iterative optimization of the cost function, such as the Ordered Subset (OS) algorithm and the Iterative Coordinate Descent (ICD) algorithm. These techniques use different iterative numerical approaches to converge to a solution that has improved image quality. While these techniques have provided large advances in diagnostic capability, it has come at the cost of greatly increased computation time to reconstruct the images when compared with traditional single-pass methods such as FBP. The amount of time the iterative optimization techniques takes to converge to a solution depends on the characteristics of the data and the initial conditions. Some of the techniques, such as OS for example, converge quickly on data sets that are more homogeneous or uniform, commonly referred to as "low frequency" data. Other techniques, such as ICD for example, converge quickly on data sets with edges and noise, commonly referred to as "high frequency", data but require more computation time for homogeneous regions. When a given technique encounters a data type that it is less efficient, the number of iterations and hence computation time, increases.

Further, in the clinical environment, images are reconstructed to zoom over the portion of the anatomy relevant for diagnosis. To reconstruct a targeted area, iterative reconstruction algorithms differ from conventional techniques such as FBP in that they generally require reconstructing the entire field of view, which includes all the objects measured by the CT system. Such a full field reconstruction is performed with iterative reconstruction algorithms to achieve good image quality. This is due to the fact that iterative reconstruction requires the consideration of all possible sources of x-ray attenuation along the whole path lengths between the x-ray source and the detector. However, this implies significant computational cost for targeted reconstruction of a small area. For instance, reconstructing a 512×512 image in 35 cm field of view where the bore of the CT scanner is 70 cm in diameter would require iterating over a 1024×1024 image in 70 cm field of view (assuming uniform pixel spacing) to guarantee that all possible sources of x-ray attenuation are captured in the reconstruction. That would be four times the number of voxels reconstructed with FBP.

While existing reconstruction techniques are suitable for their intended purpose, there is a need for improvements, especially in reducing the amount of time needed to reconstruct an image while maintaining high quality levels provided by iterative optimization techniques.

BRIEF DESCRIPTION OF THE INVENTION

An imaging system is provided having a source generating an x-ray beam. A detector array is arranged to receive the x-ray beam and generate projection data. A translatable table is configured for disposal of an object thereon and operable to translate in relation to the source and the detector array. The source and detector array are arranged to rotate about the translating table to helically scan the object. An image reconstructor is electrically coupled to the detector array, where the image reconstructor has a processor responsive to executable computer instructions when executed on the processor for performing a first reconstruction to reconstruct a first image in response to the projection data via a first iterative reconstruction technique. Wherein the image reconstructor is further responsive to executable computer instructions for performing a second reconstruction of a second image in response to the first image via a second iterative reconstruction technique.

A method of reconstructing an image of an object is also provided. The method includes the step of generating an x-ray beam. The x-ray beam is received on a detector array. Projection data is generated based on said x-ray beams received by the detector array. The projection data is provided to an image reconstructor. A first iterative reconstruction technique is performed to reconstruct a first image in response to the projection data. A second iterative reconstruction technique is performed to reconstruct a second image in response to the first image.

A method of reconstructing a computed tomography image with incomplete data is also provided. The method includes the step of generating an x-ray beam with an x-ray source. The x-ray beams are transmitted through an object and received on a detector array. The x-ray source and the detector array are rotated around the object, wherein the x-ray beams do not pass through a portion of the object during portions of the rotation. Projection data is generated based on the x-ray beams received by the detector array, wherein the project data includes a first portion and a second portion. The first portion represents data for the portion of said object that the x-ray beams were transmitted during the rotation, and the second portion represents data that the x-rays beams did not pass through the object during portions of the rotation. The projection data is provided to an image reconstructor. A first iterative reconstruction technique is performed to reconstruct a first image in response to the first portion of projection data. Finally, a second iterative reconstruction technique is performed to reconstruct a second image in response to said second portion of projection data.

BRIEF DESCRIPTION OF THE DRAWINGS

The invention will be described in conjunction with the accompanying drawings, in which.

DETAILED DESCRIPTION OF THE INVENTION

Definitions

Figure 1:
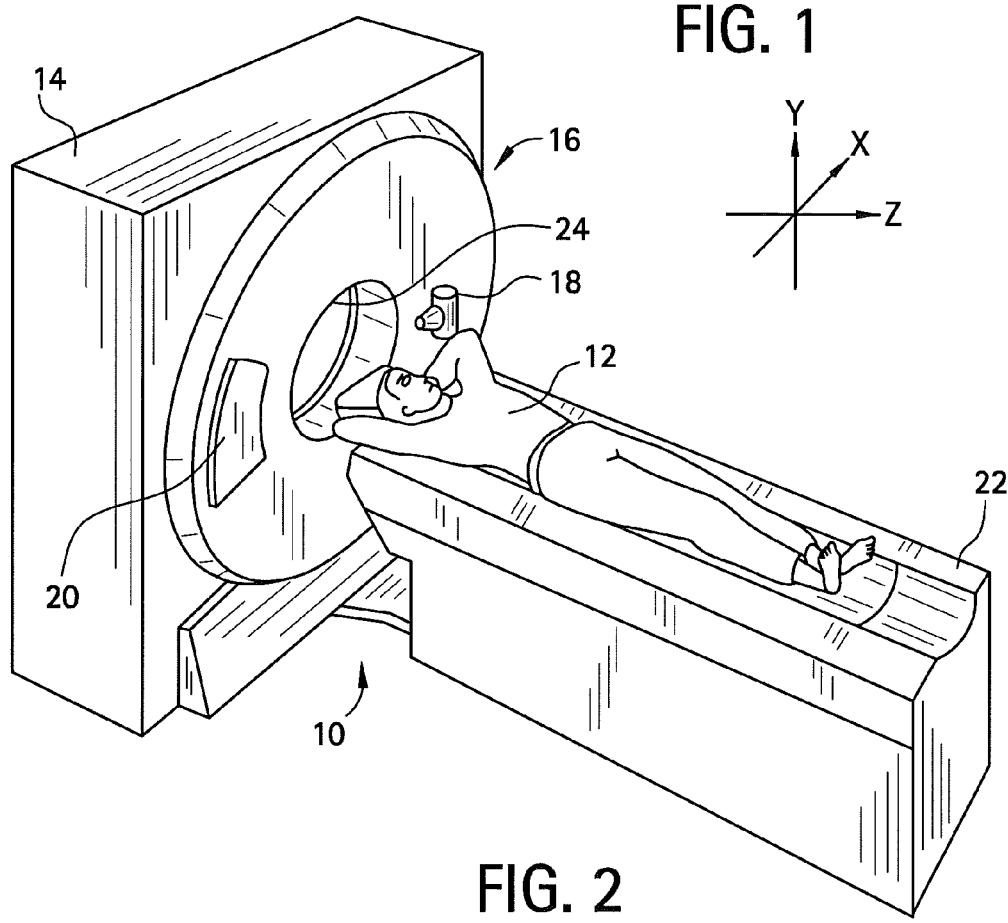
FIG. 1 is a pictorial view of a multi-slice helical scan CT imaging system utilizing a method of reconstructing an image in accordance with an embodiment of the present invention.

Where the definition of terms departs from the commonly used meaning of the term, applicant intends to utilize the definitions provided below, unless specifically indicated.

As used herein, the term "image space" refers to a set of vectors arranged in an array for use with a method of the present invention. The array may be of any number of dimensions, such as two-dimensional, three-dimensional, four-dimensional, for example. An example of an image space that may be used in a method described herein is a set of all possible images representable on a lattice of a given dimension. A single element (vector) of the set of the image space may be viewed on a visual display apparatus to allow a user to gain information of the interior of a scanned object.

As used herein, the term "forward model" refers to a description of the transformation from the image space of a scanned object to the projection space for a scanned object, as modeled after the operation of the CT imaging system. The operation of the forward model on an image vector is referred to as "forward projection."

As used herein, the term "computed tomography model" refers to a mathematical description of the relation between a vector in the image space and a vector in the projection space. A computed tomography model includes a forward model and a cost function chosen to evaluate the closeness of a match between a projection vector and a forward projection of an image vector by a forward model.

As used herein, the term "projection space" refers to a set of vectors of integral X-ray attenuation values. The vectors that make up a projection space may comprise data from an X-ray CT scanner. Also, the vectors that make up a projection space may be forward projections of vectors from an image space.

As used herein, the term "visual display device" refers to any type of device such as a CRT monitor, LCD screen, projected image, etc. used to visually inspect multidimensional vectors.

As used herein, the term "multi-slice computed tomography imaging system" refers to an X-ray CT scanner in which a detector array contains multiple rows of detectors, each row occupying a different position along the axis of the system about which the gantry rotates.

As used herein, the term "filtered back projection" refers to a technique of reconstructing images from projection data by processing data in the projection space, then forming the value of each element in the image space as a linear combination of values from processed data, those values taken from projection space points to which the given image element contributes in forward projection. Filtered back projection techniques are described in such places as Avinash C. Kak and Malcolm Slaney, "Principles of Computerized Tomographic Imaging," Classics in Applied Mathematics, 33, SIAM, 2001, ISBN:089871494X, the entire contents and disclosure of which is hereby incorporated by reference.

As used herein, the term "high quality reconstruction image" refers to an image space vector whose accuracy as a representation of the object under study is comparable to those produced by currently available commercial CT imaging systems and known in the art.

Description

While the present invention is described with respect to apparatus and methods of reconstructing an image using iterative techniques for a computed tomography (CT) imaging system (such as a multi-slice CT imaging system), the following apparatus and method are capable of being adapted for various purposes including, but not limited to the following applications: magnetic resonance imaging (MRI) systems, CT systems, radiotherapy systems, X-ray imaging systems, ultrasound systems, nuclear imaging systems, positron emission tomography (PET) systems, magnetic resonance spectroscopy systems, and other applications known in the art, such as but not limited to applications outside medical imaging such as nondestructive testing, geological and astronomical imaging, and in general a large class of inverse problems including any form of estimation over a cost function which requires an iterative algorithm to achieve the solution.

In the following description, various operating parameters and components are described for one constructed embodiment. These specific parameters and components are included as examples and are not meant to be limiting.

Referring now to FIG. 1, a pictorial view of a CT imaging system 10 (multi-slice system in an exemplary embodiment), utilizing a method of reconstructing an image of medical patient 12 in accordance with an embodiment of the present invention is shown. The imaging system 10 includes a gantry 14 that has a rotating inner portion 16 containing an x-ray source 18 and a detector array 20. X-ray source 18 projects a beam of x-rays toward detector array 20. Source 18 and detector array 20 rotate about an operably translatable table 22. Table 22 is translated along the z-axis between source 18 and detector 20 to perform a helical scan. The beam, after passing through medical patient 12, within a patient bore 24, is detected at detector array 20 to generate projection data that is used to create a CT image.

Figure 2:
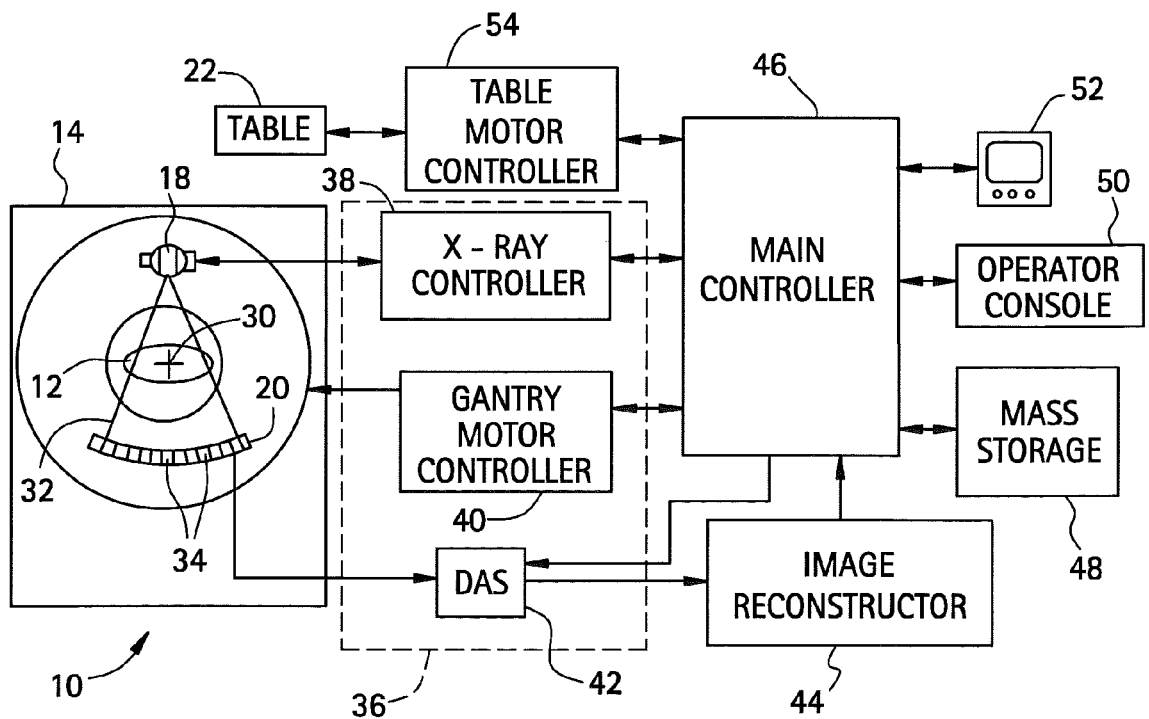
FIG. 2 is a block diagrammatic view of the multi-slice helical scan CT imaging system in accordance with an embodiment of the present invention.

Referring now to FIG. 2, a diagrammatic view of system 10 in accordance with an exemplary embodiment is shown. Source 18 and detector array 20 rotate about a center axis 30. Beam 32 is received by multiple detector elements 34 in multiple detector rows. Each detector element 34 generates an electrical signal corresponding to the intensity of an impinging x-ray beam. As beam 32 passes through patient 12, beam 32 is attenuated. Rotation of the center portion of the gantry and the operation of source 18 are governed by a control mechanism 36. Control mechanism 36 includes an x-ray controller 38 that provides power and timing signals to source 18 and a gantry motor controller 40 that controls the rotational speed and position of the center portion of the gantry. A data acquisition system (DAS) 42 samples analog data from detector elements 34 and converts the analog data to digital signals for subsequent processing. An image reconstructor 44 receives sampled and digitized x-ray data from DAS 42 and performs image reconstruction. A main controller 46 stores the CT image in a mass storage device 48.

Main controller 46 also receives commands and scanning parameters from an operator via an operator console 50. A display 52 allows the operator to observe the reconstructed image and other data from main controller 46. The operator supplied commands and parameters are used by main controller 46 in operation of DAS 42, x-ray controller 38, and gantry motor controller 40. In addition, main controller 46 operates a table motor controller 54, which translates table 22 to position patient 12 in gantry 14.

X-ray controller 38, gantry motor controller 40, image reconstructor 44, main controller 46, and table motor controller 54 are preferably based on micro processors device capable of accepting data and instructions, executing the instructions to process the data, and presenting the results, such as a computer having a central processing unit, memory (nonvolatile, random-access, and/or read-only), and associated input and output buses. X-ray controller 38, gantry motor controller 40, image reconstructor 44, main controller 46, and table motor controller 54 may be a portion of a central control unit or may each be a discrete, stand-alone components as shown. Therefore, the X-ray controller 38, gantry motor controller 40, image reconstructor 44, and main controller 46 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer or a hybrid of any of the foregoing.

Figure 4:
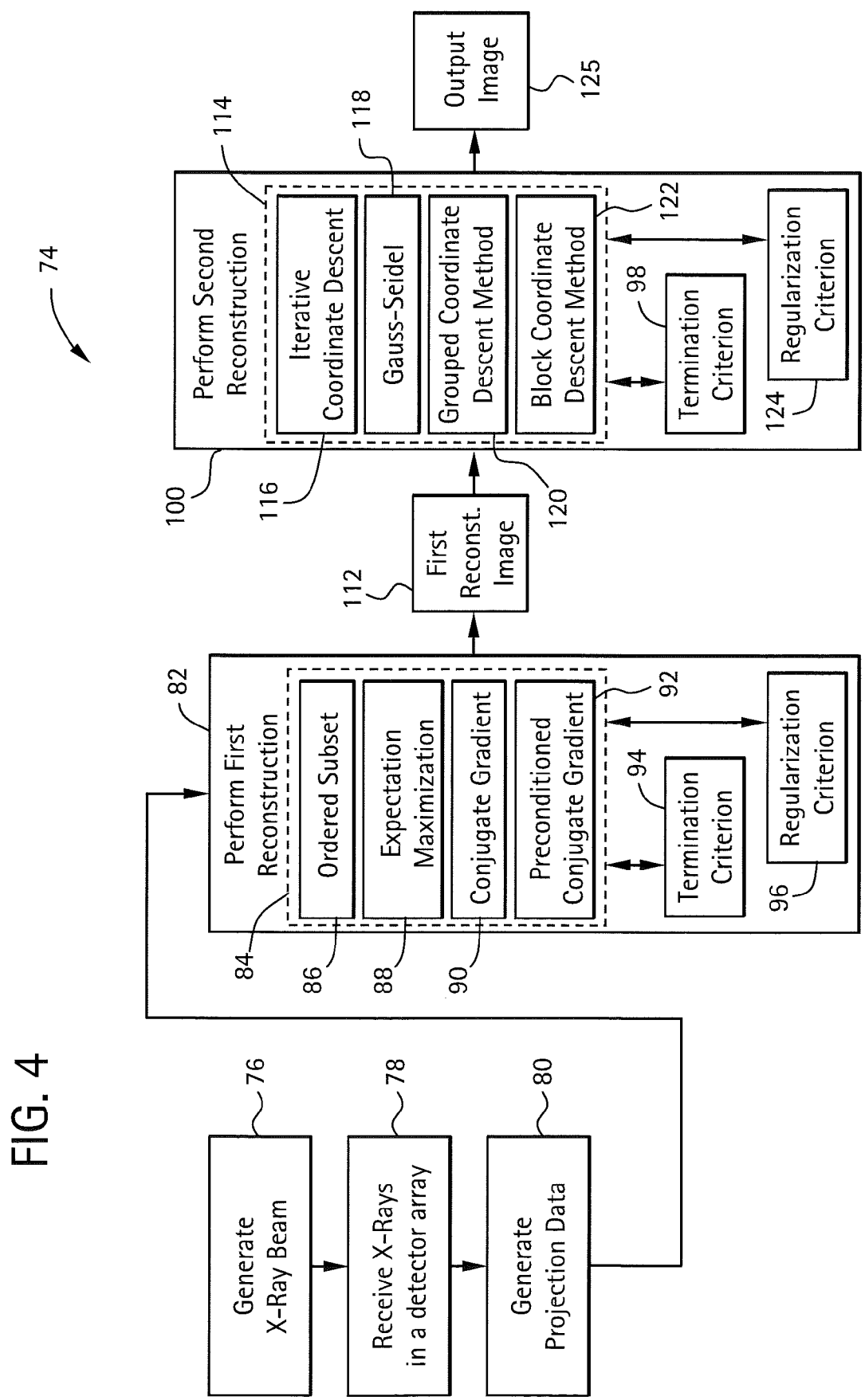
FIG. 4 is a flowchart of an exemplary reconstruction method in accordance with an embodiment of the invention.

X-ray controller 38, gantry motor controller 40, image reconstructor 44, and main controller 46 also include operation control methods embodied in application code, such as that shown in FIG. 4 for example. These methods are embodied in computer instructions written to be executed by a processor, typically in the form of software. The software can be encoded in any language, including, but not limited to, assembly language, VHDL (Verilog Hardware Description Language), VHSIC HDL (Very High Speed IC Hardware Description Language), Fortran (formula translation), Pascal, PL/I, C, C++, Visual C++, C#, Java, ALGOL (algorithmic language), BASIC (beginners all-purpose symbolic instruction code), visual BASIC and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Figure 3:
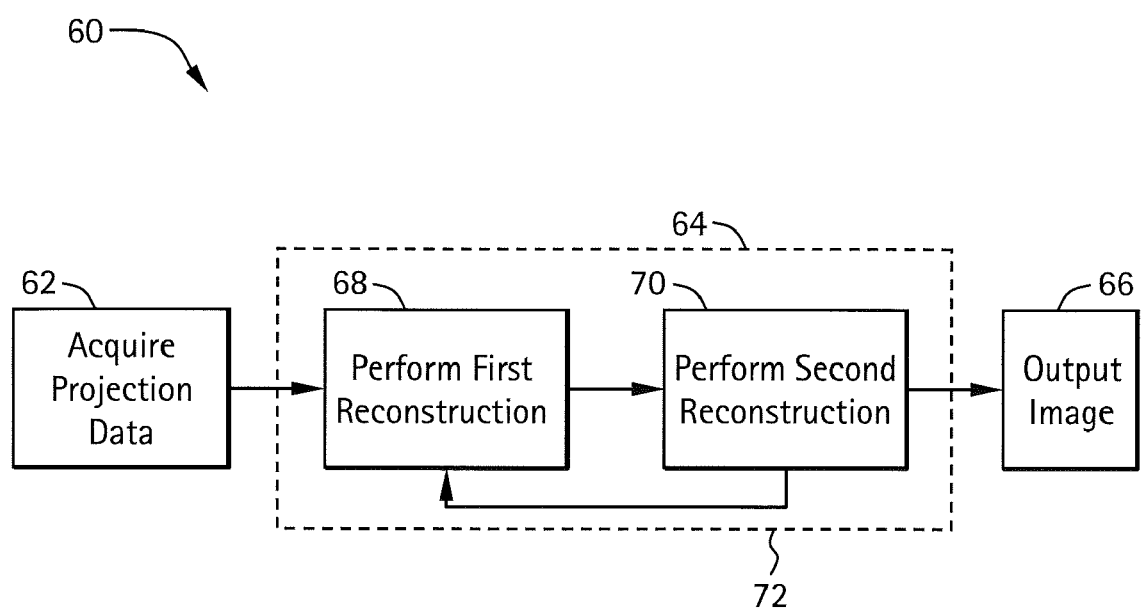
FIG. 3 is a flowchart of an exemplary reconstruction method.

Referring to FIG. 3, an exemplary hybrid optimization iterative reconstruction method is illustrated. The process 60 begins by acquiring projection data 62 received by the detector array 20. The projection data is then processed in a multi-stage reconstruction process 64 before the high quality reconstruction image is output 66. Statistical methods for reconstructing an image typically work by minimizing a cost function that consists of one or two terms, such as defined by the following equation:

$$x = \arg\min L(y, Ax) + R(x), \qquad \text{Equation 1}$$

where x is the object to be reconstructed from projection data. "A" denotes the system matrix that describes the imaging system geometry and physical properties. L( ) is a data-fit term that describes the mismatch between the measured projection data "y" and the predicted data "Ax". The term R(x) denotes an optional regularization term that encourages the reconstructed image to conform to prior expectations on the image properties, such as smoothness.

As discussed above, iterative reconstruction techniques will converge at different rates depending on the type of data and the initial conditions. While a number of iterative reconstruction techniques are efficient at converging different types of data, no single iterative reconstruction technique will rapidly converge to a solution on all types of data and initial conditions. The iterative reconstruction techniques may be generally grouped into two categories, projection-based algorithms that converge quickly on low frequency data, and voxel-based techniques that converge quickly on high frequency data. The reconstruction step 64 solves the issue of large number iterations by reconstructing the image with first reconstruction in step 68 that can quickly converge on a solution for a portion of the projection data. In the exemplary embodiment, the reconstructive iteration technique used in step 68 is a projection-based technique that converges quickly on low frequency data for example. The reconstructed image from this first reconstruction 68 is then used as an input for a second reconstruction step 70 that is selected to converge to a solution quickly for the portions of the image where convergence was not completely achieved during the first reconstruction step 68. In the exemplary embodiment, a projection-based technique is used in the first step 68, and a voxel-based technique is then used to converge the high frequency data. As will be discussed in more detail below, the reconstruction step 64 may include a loop 72 that allows the reconstructed image from the second reconstruction set 70 as an input into first reconstruction step 68.

Thus, by combining two (or more) reconstruction techniques a more rapid convergence to the image solution may be achieved. In one embodiment, the first reconstruction step 68 utilizes an Ordered Subset (OS) technique to converge homogeneous portions of the image, such as a liver or spleen for example. The OS reconstructed image is then passed as an input to the second reconstruction step 70 that utilizes Iterative Coordinate Descent (ICD) algorithms to achieve faster convergence of the portions of the image containing high frequency data, such as hard edges (e.g. bone) or noise for example. The combination of the OS technique and the ICD technique are exemplary and the scope of the claimed invention should not be so limited.

Another embodiment of the hybrid optimization iterative reconstruction method is illustrated in FIG. 4. In this embodiment, the process 74 starts by generating x-ray beams 76, such as with source 18 for example. The x-rays are received 78 by detector array 20 and projection data is generated 80 by the data acquisition system 42. The projection data is then passed to a first reconstruction process 82. The first reconstruction process 82 uses a projection-based algorithm 84 to provide a rapid convergence of low frequency data in the image. In the exemplary embodiment, there may be several different algorithms that may be used. The projection-based algorithm may be based on OS 86 as discussed above, or other algorithms, such as and not limited to, Expectation Maximization (EM) 88, Conjugate Gradient (CG) 90, and Preconditioned Conjugate Gradient (PCG) 92 for example. The algorithm technique selected may depend on factors such as the type of data in the projection data and the initial conditions. The operator may select the algorithm technique used, or the image reconstructor 44 may select it automatically. Each of the algorithms used in the first reconstruction process 82 may have criteria, such as termination criteria 94 or regularization criteria 96 for example, or may have parameters such as element volume and shape for example. The operator depending on the image quality and processing speed that they require may set these criteria and parameters.

The termination criterion provides a means for the operator to limit the number of iterations that are performed during the first reconstruction process 82. The termination criterion 94 may be as simple as the operator defining a fixed number of cycles. The number of cycles selected may depend on a number of factors such as the amount of noise or hard edges in the projection data 80. The larger the amount of noise for example, the larger the number of cycles would be needed to converge to the solution since the projection-based algorithm techniques used in the first reconstruction process 82 are less efficient with this type of data. The termination criterion may also be more elaborate. In another embodiment, the termination criterion may be set by cost function threshold. Once the threshold is crossed, the iterations stop. In another embodiment, the thresholds for termination criterion 92 may be related with the termination criterion 98 of the second reconstruction process 100 such that the termination threshold 92 is greater than the termination threshold 94 for example. Other criteria that are more physically meaningful may also be used, such as by comparing the average amount of change in the full image volume over the previous iteration. In another embodiment, measurements such as the change in a threshold measured in Hounsfield units can be used. The Hounsfield unit scale is a linear transformation of an original linear attenuation coefficient measurement and generally provides a measurement of the change in the attenuation coefficient between water and air. In yet another embodiment, the Hounsfield unit threshold H1 for the first reconstruction process 82 is greater than the Hounsfield unit threshold H2 for the second reconstruction process 100.

Figure 5:
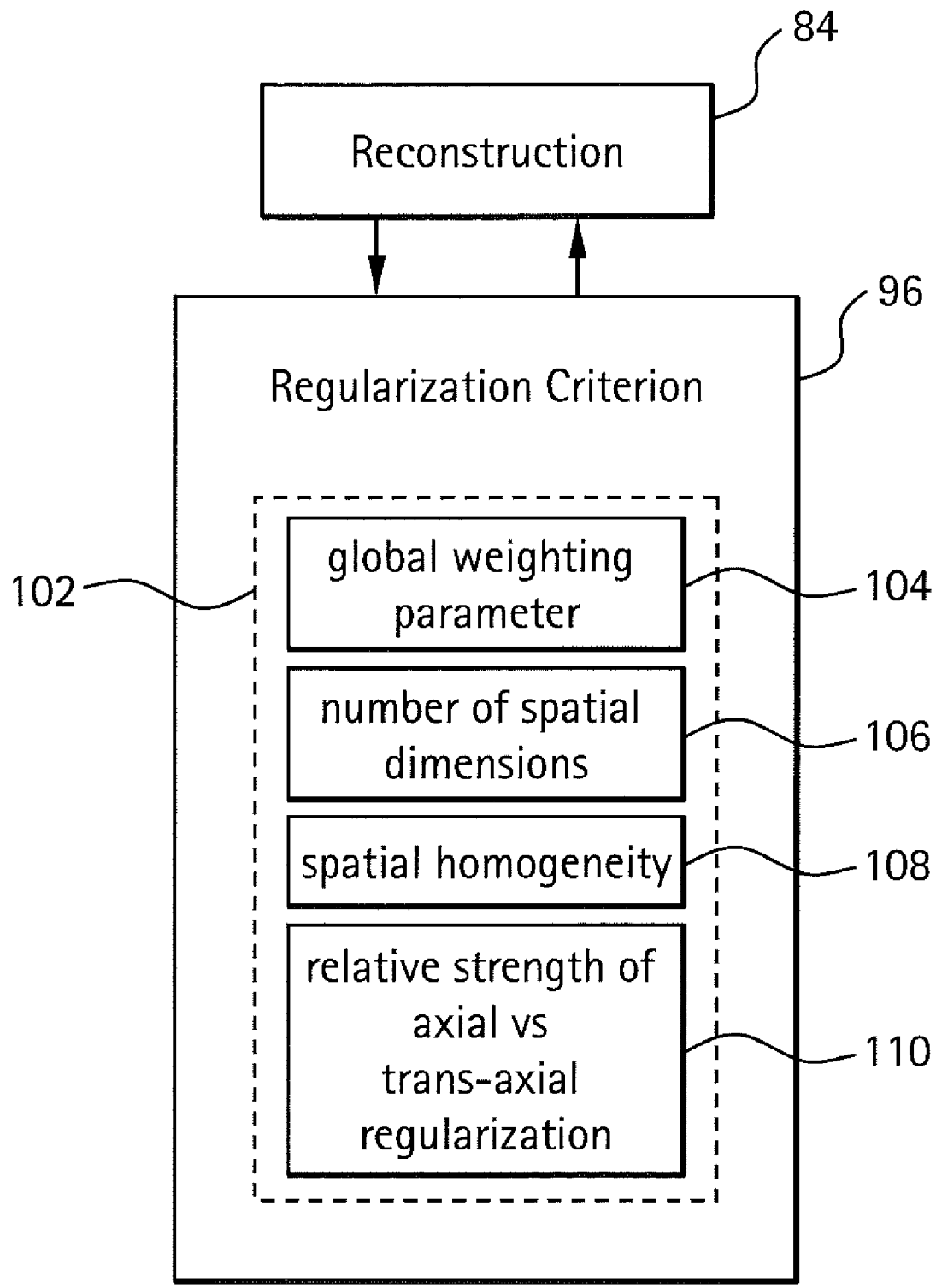
FIG. 5 is a flow chart of an exemplary reconstruction method having a variable regularization criterion in accordance with an embodiment of the invention.

The regularization criterion 96 allows the operator to control how much the reconstruction process will encourage the reconstructed image to conform with prior expectations on the image properties as shown in FIG. 5. The regularization criterion 96 affects areas such as piecewise smoothness. A number of different factors 102 maybe utilized to affect the regularization criterion 96. These factors include a global weighting parameter 104, which affects the variation of the global strength of the regularization function between stages of the reconstruction. A parameter defining the number of spatial dimensions 106 included in the regularization function that are changed between stages of reconstruction may also be set. The third regularization parameter defines the variation in the spatial homogeneity 108 of the regularization between stages of regularization. Finally, the relative strength of the axial versus the trans-axial regulation 110 may be varied between stages of the iterations. It should be appreciated that the factors 102 described herein are exemplary and that the claimed invention should not be so limited.

Referring once again to FIG. 4, once the termination criterion 94 and the regularization criterion 96 are defined, either by the operator or automatically by the process 74, the projection data 80 is reconstructed and back projection data or a first reconstructed image 112 is generated. The first reconstructed image 112 is then passed to the second reconstruction process 100. As with the first reconstruction process 82, the second reconstruction process 100 may use a variety of iterative algorithm techniques 114 to perform the reconstruction. In this embodiment, the second iterative algorithm techniques 114 are voxel-based iteration algorithms. These voxel-based iterative algorithms include, but are not limited to, Iterative Coordinate Descent (ICD) 116, Gauss-Seidel 118, Grouped Coordinate Descent Method 120, and Block Coordinate Descent Method 122. As with the first reconstruction criterion 82, a termination criterion 98 and a regularization criterion 124 may be defined.

In one embodiment, different regularization models may be used for the first reconstruction process 82 and the second reconstruction process 100. For example, where the first reconstruction process 82 uses an OS technique 86, an over-regularization parameter having a strong smoothing penalty may be used to speed-up the convergence by making the image more stable. The second reconstruction process 100 then may use a lower regularization strength to finally converge to the desired image quality. For example, where the OS technique 86 combined with the ICD technique 116, the ICD algorithm is fast at converging high-frequency data and there will be little impact on the convergence speed while the processing speed of the OS technique 116 has been significantly increased. In other embodiments, the desired image quality may require a complex regularization model, such as the q-Generalized Gaussian Markov Random Fields (q-GGMRF) model. To minimize the processing time associated with these complex models, the regularization criterion may be changed and a simpler quadratic regularization is used during early iterations and the q-GGMRF is utilized in later iterations.

The second reconstruction process 100 uses the first reconstructed image 112 to process the image further and generate a high quality reconstruction image output 125. The clinician then performs diagnostic analysis on the output image 125. It should be appreciated that while the exemplary embodiment illustrated in FIG. 4 uses two reconstruction processes 82, 100, additional reconstruction steps may also be utilized. Depending on the type of object being imaged, or the quality of the projection data 80, additional iterative algorithms may be used to address the issues associated with producing the desired image. For example, the process 74 may start with a reconstruction using the OS technique 86, pass the reconstructed image to a second reconstruction process using the PCG technique 92 and then end with the third reconstruction process that utilizes the ICD technique 116.

Further, while the embodiments described herein use a projection-based technique 84 first, then followed by a voxel-based technique 114, this is not necessary to achieve faster computation times. However, there are advantages to using a projection-based technique 84 in that the same model/cost function:

$$L(y,Ax)+R(x) \qquad \text{Equation 2}$$

may be used in both low resolution images reconstructions and high resolution image reconstructions. This approach thus shortens the amount of time required for convergence on the high-resolution image.

Figure 6:
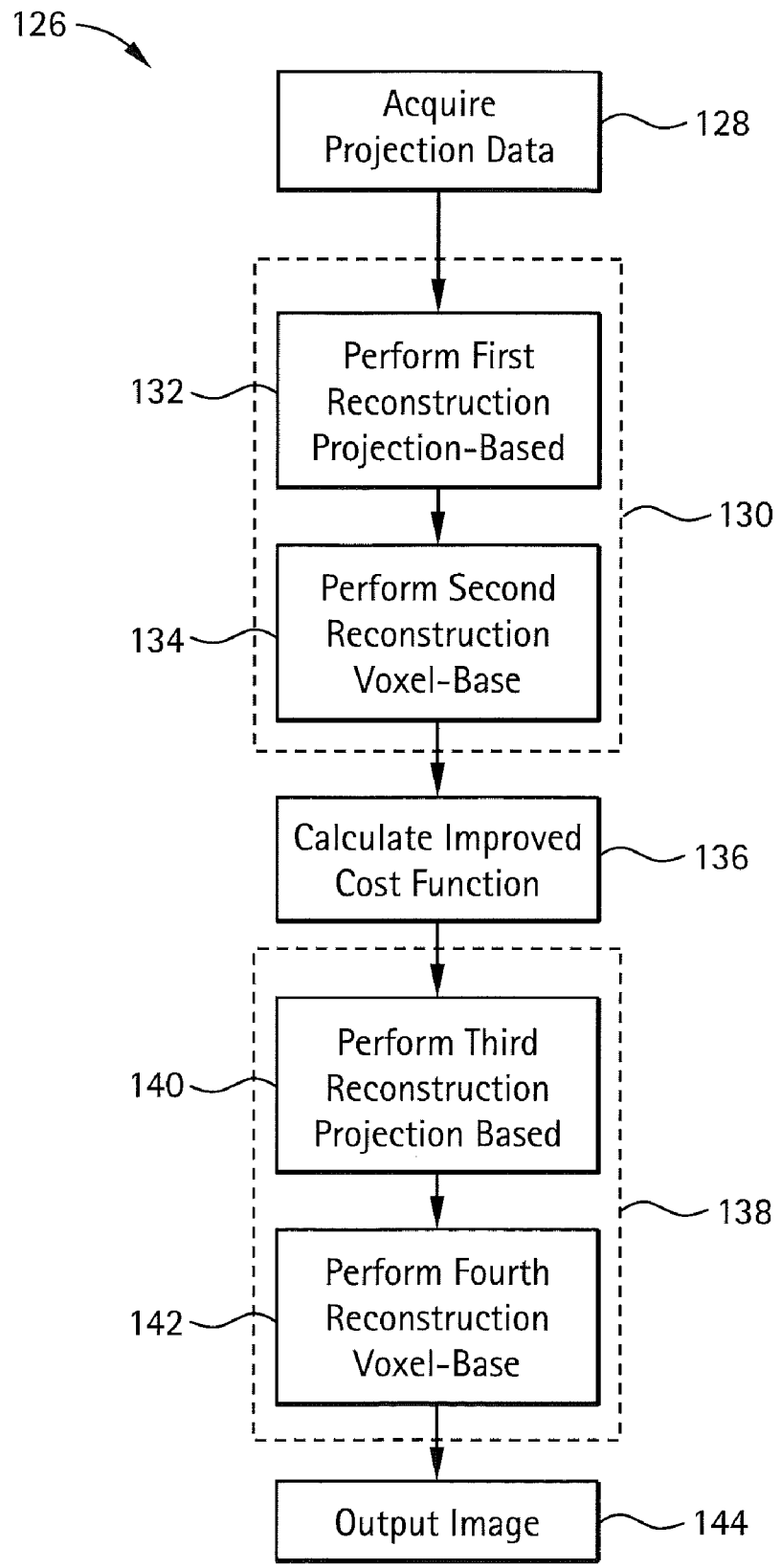
FIG. 6 is a flow chart of an exemplary reconstruction method in accordance with another embodiment of the invention.

Another embodiment for reconstructing projection data is illustrated in FIG. 6. In this embodiment, the process 126 starts by acquiring the projection data 128. The projection data 128 is then passed into a first reconstruction process 130 that includes a first reconstruction sub-process 132 and a second reconstruction process 134. The reconstruction sub-processes 132, 134 are similar to those described above with respect to FIG. 4. The first reconstruction process 130 produces an image that is analyzed by the process 126. From this analysis, an improved cost function term is calculated 136. This improved cost function allows for improved image quality to achieve the desired results while minimizing computation time. Using the improved cost function, the reconstructed image produced by process 130 is passed to a second reconstruction process 138. As with the first reconstruction process 130, the second reconstruction process 138 includes a first reconstruction sub-process 140 and a second reconstruction sub-process 142. In the exemplary embodiment, the first reconstruction sub-processes 132 use a projection-based iteration technique, while the second reconstruction sub-processes 134, 142 use a voxel-based iteration technique. Once the second reconstruction process 138 is completed, the process 126 outputs the desired high quality reconstruction image 144.

The methods described above may also be combined in different manners to provide a more efficient overall reconstruction of the image. For example, in addition to changing the cost function, other parameters that affect speed and accuracy of the reconstruction may be varied, these parameters include but not limited to, shape of the volume element, size of the volume element, and sampling density. In one embodiment, a larger voxel size is used in the first reconstruction than in the second. In another embodiment, a different volume element shape, such as a spherically symmetric image basis function (commonly referred to as "blobs") for example, is used in the first reconstruction and a cubic or rectangular voxel is used in the second reconstruction. In yet another embodiment, the projection data may be reduced in some reconstructions, such as by using only every other projection view in the first reconstruction while using every projection view in the second reconstruction. It should be appreciated that these embodiments may be further combined together to achieve the desired balance of speed, quality and computational efficiency without deviating from the scope of the claimed invention.

In practice, a clinician is not typically concerned with performing a diagnostic analysis on the entire object being imaged, but is rather interested in a particular portion of the object. For example, where the object is a patient, the clinician may be interested determining if the patient has pathology in the kidneys or liver. These areas are known as a Region of Interest (ROI). Therefore, it is desirable to provide a higher resolution of the ROI. One disadvantage with previous iterative techniques is that they required performing the reconstruction process on the entire imaged object and did not allow for efficient high-resolution reconstruction of only a portion of the image. This issue led to very long reconstruction processing times for the ROI.

Figure 7:
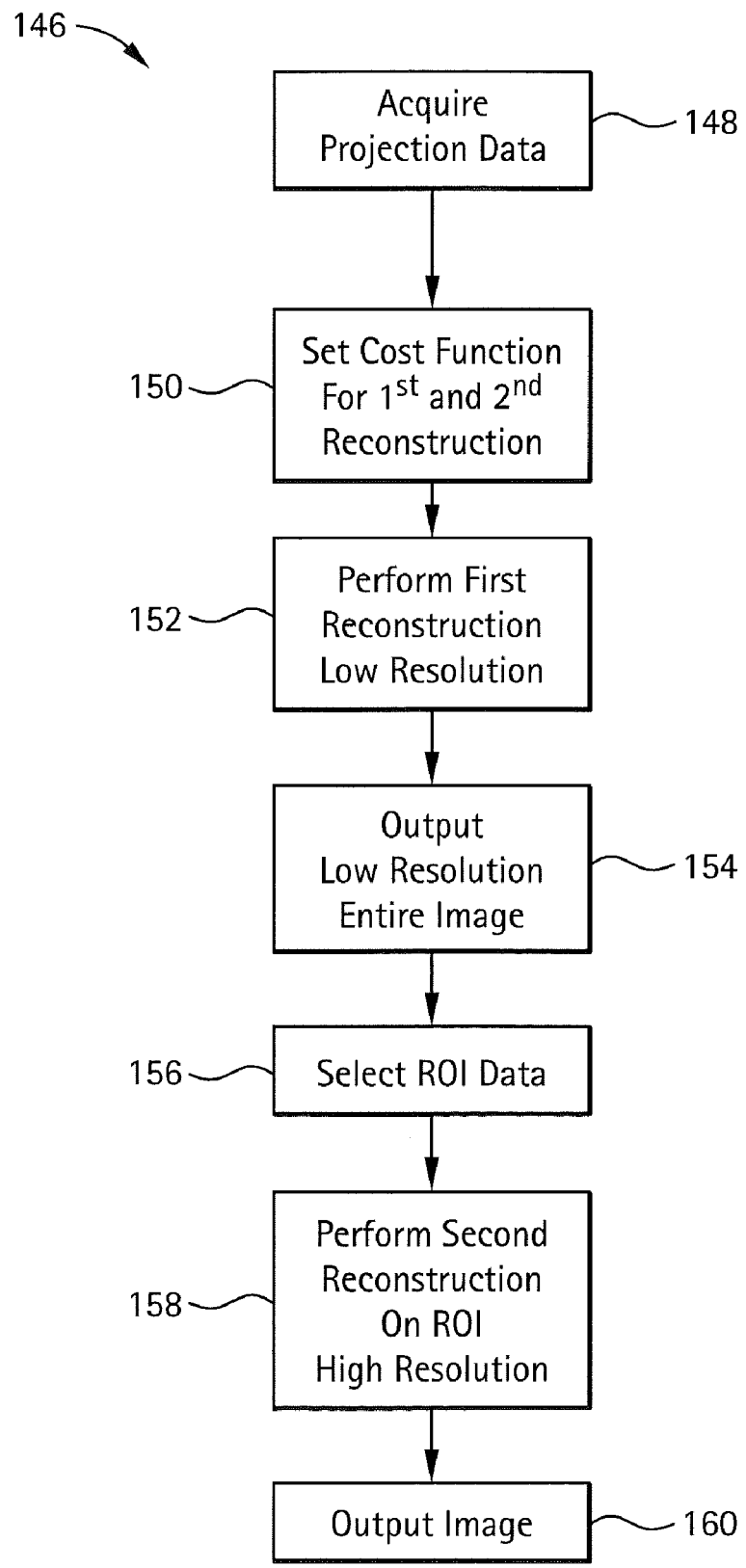
FIG. 7 is a flowchart of an exemplary reconstruction method for a region of interest in accordance with another embodiment of the invention.

The issue of long processing times may be alleviated through the combination of iterative techniques described herein. Turning now to FIG. 7, the process for providing a high-resolution image of the ROI will be described. The process 146 starts by acquiring projection data 148. The cost function for both the first and second reconstruction processes is set 150. Using this cost function, the projection data is passed to a first reconstruction process 152 that performs the reconstruction at a low image resolution. A reconstructed image of the entire object is output 154 at the low-resolution level. The data for the ROI is selected 156 and the data from output 154 at the edges of the ROI are used as initial conditions for the second reconstruction process 158. The second reconstruction process 158 reconstructs the ROI image and outputs a final ROI high quality reconstruction image 160. As discussed above, in this embodiment, the first reconstruction process 152 uses a projection-based technique, while the second reconstruction process 156 uses a voxel-based technique. This combined iteration technique approach allows for the creation of a high-resolution image for the ROI that rapidly converges.

Figure 8:
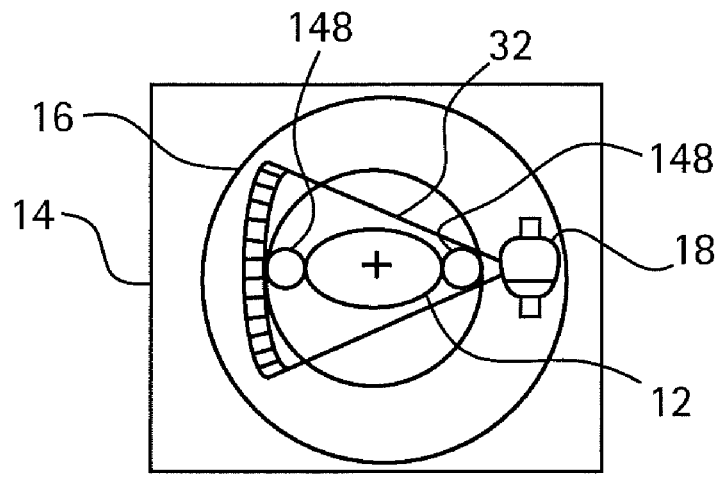
FIG. 8 is a pictorial view of a multi-slice helical scan CT imaging system in a first position and having a patient that is larger than can be imaged; and, FIG. 9 is a pictorial view of the multi-slice helical scan CT imaging system of FIG. 8 in a second position.
Figure 9:
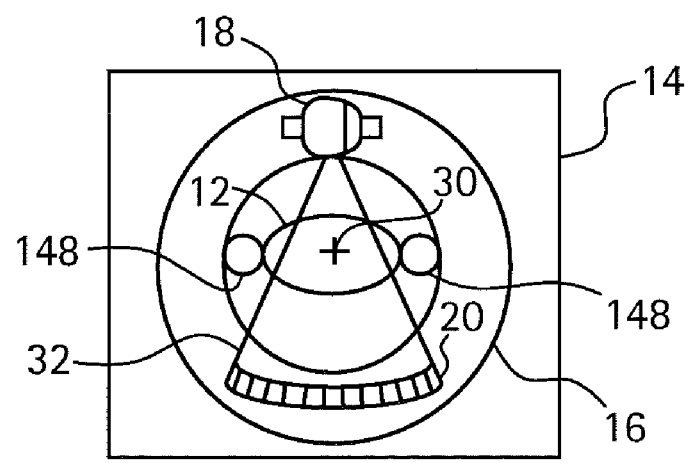

Another issue that arises in practice is when the object to be imaged, such as patient 12, is larger than the field of view of the X-ray source 18 and detector array 20 located within rotating inner portion 16, as illustrated in FIG. 8 and FIG. 9. In this circumstance, portions of the patient body 12, such as arm 148 for example, will be outside of the beam 32 during certain portions of the scanning process. In the example illustrated in FIG. 8 and FIG. 9, the patient's arm 148 is within the field of view when the X-ray source 18 and detector array 20 are in the position shown in FIG. 8. However, as the gantry 14 is rotated about the patient 12 about center axis 30, the arm 148 falls outside the beam 32. As a result, the projection data collected is incomplete. Using traditional techniques to reconstruct the image have been ineffective since analytical techniques, such as Filtered Back-Projection (FBP) for example, provided inaccurate results with incomplete data sets. Iterative methods, in general, can accurately reconstruct the image from truncated data sets. But some optimization algorithms, such as voxel-based techniques, such as ICD for example, required such long convergence times that the process was impractical for clinical use.

The systems and methods described herein provide advantages in this situation. When iteratively reconstructing an image of an object from incomplete or truncated data, often the reconstruction starts from a set of incomplete initial conditions. In those areas of the initial image that are incomplete, most missing information is low-frequency content, and less information is high-frequency content. Therefore, using the OS technique by itself would be faster than the ICD technique by itself By using multiple iterative reconstruction processes in series, the areas of projection data that are more homogeneous or uniform can be converged more quickly using a projection-based iteration technique, such as OS for example, in the first iterations, and the remaining iterations can be performed with a voxel-based technique, such as ICD for example, to quickly converge the high frequency components and reach the solution rapidly. Thus, the multi-stage iterative reconstruction systems and processes discussed herein allow for the reconstruction of patient data that previously was inefficient. This provides further advantages in allowing existing computed tomography systems to be used on a wider variety of patient shapes and sizes, without excessive negative impact on iterative reconstruction speed.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to reconstruct two dimensional projection data into three dimensional image data that may be used by a clinician for diagnostic purposes.

While the invention has been described with reference to exemplary embodiments, it will be understood by those skilled in the art that various changes may be made and equivalents maybe substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An imaging system comprising:
a source generating an x-ray beam;
a detector array receiving said x-ray beam and generating projection data;
a translatable table configured for disposal of an object thereon and operable to translate in relation to said source and said detector array;
said source and said detector array rotating about said translating table to helically scan said object;
an image reconstructor electrically coupled to said detector array, said image reconstructor having a processor responsive to executable computer instructions when executed on the processor for performing a first reconstruction to reconstruct a first image in response to said projection data via a first iterative reconstruction technique; and,
wherein said image reconstructor is further responsive to executable computer instructions for performing a second reconstruction of a second image in response to said first image via a second iterative reconstruction technique; and
wherein said first iterative reconstruction technique converges on said data with lower spatial frequencies faster than on data with higher spatial frequencies, and said second iterative reconstruction technique converges on said data with higher spatial frequencies faster than on data with lower spatial frequencies.

2. The imaging system of claim 1 wherein said first iterative reconstruction technique is a projection-based technique and said second iterative reconstruction technique is a voxel-based technique.

3. The imaging system of claim 1 wherein said first iterative reconstruction technique terminates based on a first criterion and said second iterative reconstruction technique terminates based on a second criterion, wherein said first criterion is different from said second criterion.

4. The imaging system of claim 1 wherein:
said first iterative reconstruction technique is ordered subset (OS), conjugate gradient (CG), expectation maximization (EM), or preconditioned conjugate gradient (PCG); and,
said second reconstruction technique is iterative coordinate descent (ICD), blocked Iterative Coordinate Descent (blocked ICD), or Gauss-Seidel (GS).

5. The imaging system of claim 4, wherein said first iterative reconstruction technique is an ordered subset (OS) technique, and said second iterative reconstruction technique is a iterative coordinate descent (ICD) technique.

6. The imaging system of claim 1 wherein:
said first iterative reconstruction technique further includes a first regularization criterion, wherein said regularization criterion changes between stages of iterations of said first iterative reconstruction technique; and,
said second iterative reconstruction technique further includes a second regularization criterion, wherein said regularization criterion changes between stages of iterations of said second iterative reconstruction technique.

7. The imaging system of claim 6 wherein said first regularization criterion and said second regularization criterion are each changed by varying a parameter chosen from a group comprising: regularization global weighting parameter, number of spatial dimensions, regularization spatial homogeneity parameter, and relative strength of axial versus trans-axial regularization.

8. The imaging system of claim 1 wherein:
said first iterative reconstruction technique further includes a first volume element having a first element parameter, wherein said first element parameter defines a first volume element shape or first volume element volume;
said second iterative reconstruction technique further includes a second volume element having a second element parameter, wherein said second element parameter defines a second volume element shape or a second volume element volume; and,
wherein said first element parameter is different from said second element parameter.

9. The imaging system of claim 8 wherein said first iterative reconstruction technique further includes a first sampling density and said second iterative reconstruction technique includes a second sampling density, wherein said first sampling density is less than said second sampling density.

10. The image system of claim 1 wherein said first iterative reconstruction technique is performed at a first resolution and said second iterative reconstruction technique is performed at a second resolution on a user-defined portion of said projection data, wherein said second resolution is higher than said first resolution.

11. The image system of claim 10 wherein said image reconstructor is further responsive to perform a third iterative reconstruction technique to reconstruct a third image in response to said reconstruction of said second image wherein said third iterative reconstruction technique includes a third cost function that is determined from said second iterative reconstruction technique.

12. The image system of claim 11 wherein said image reconstructor is further responsive to perform a fourth iterative reconstruction technique to reconstruct a fourth image in response to said reconstruction of said third image.

13. A method of reconstructing an image of an object comprising:
generating an x-ray beam;
receiving said x-ray beam on a detector array;
generating projection data based on said x-ray beams received by said detector array;
providing said projection data to an image reconstructor;
performing a first iterative reconstruction technique to reconstruct a first image in response to said projection data; and,
performing a second iterative reconstruction technique to reconstruct a second image in response to said first image; and,
wherein said first iterative reconstruction technique converges on said projection data with lower spatial frequencies earlier than higher spatial frequencies, and said second iterative reconstruction technique converges on said first image higher spatial frequencies earlier than lower spatial frequencies.

14. The method of claim 13 wherein said first iterative reconstruction technique terminates based on a first criterion and said second iterative reconstruction technique terminates based on a second criterion.

15. The method of claim 14 wherein said first criterion is a value of a first cost function and said second criterion is a value of a second cost function.

16. The method of claim 13 wherein said first reconstruction technique is a projection-based technique and said second reconstruction technique is a voxel-based technique.

17. The method of claim 16 wherein:
said first reconstruction technique is selected from a group comprising: ordered subset (OS), conjugate gradient (CG), expectation maximization (EM), and preconditioned conjugate gradient (PCG); and,
said second reconstruction technique is selected from a group comprising: iterative coordinate descent (ICD) and Gauss-Seidel.

18. The method of claim 17 wherein said first reconstruction technique includes a first regularization criterion, and said second reconstruction technique includes a second regularization criterion.

19. The method of claim 18 further comprising:
changing said first regularization criterion in between stages of said first reconstruction technique; and,
changing said second regularization criterion in between stages of said second reconstruction technique.

20. The method of claim 19 wherein said first regularization criterion and said second regularization criterion are changed by varying a parameter chosen from a group comprising: regularization global weighting parameter, number of spatial dimensions, regularization spatial homogeneity parameter, and relative strength of axial versus trans-axial regularization.

21. The method of claim 13 further comprising:
performing said first iterative reconstruction technique further includes a first volume element having a first element parameter, wherein said first element parameter defines a first volume element shape or first volume element volume;
performing said second iterative reconstruction technique further includes a second volume element having a second element parameter, wherein said second element parameter defines a second volume element shape or a second volume element volume;
wherein said first element parameter is different from said second element parameter.

22. The method of claim 13 further comprising performing said first iterative reconstruction technique at a first sample density and said second iterative reconstruction technique at a second sample density; wherein said first sample density is less than said second sample density.

23. The method of claim 13 further comprising:
performing a third iterative reconstruction technique to reconstruct a third image in response to said second image, wherein said third iterative reconstruction technique includes a third cost function, and wherein said third cost function is determined from said second image; and,
performing a fourth iterative reconstruction technique to reconstruct a fourth image in response to said third image, wherein said fourth iterative reconstruction technique includes a fourth cost function.

24. The method of claim 23 wherein said first iterative reconstruction technique is performed at a first resolution and said second iterative reconstruction technique is performed at a second resolution, wherein said second resolution is greater than said first resolution.

25. A method of reconstructing a computed tomography image with incomplete data, said method comprising:
generating an x-ray beam with an x-ray source;
transmitting said x-ray beams through an object;
receiving said x-ray beam on a detector array;
rotating said x-ray source and said detector array around said object, wherein said x-ray beams do not pass through a portion of said object during portions of said rotation;
generating projection data based on said x-ray beams received by said detector array, wherein said projection data includes a first portion and a second portion, said first portion representing data for said portion of said object through which said x-ray beams were transmitted during said rotation, and said second portion representing data including said x-rays beams which did not pass through said object during portions of said rotation;
providing said projection data to an image reconstructor;
performing a first iterative reconstruction technique to reconstruct a first image in response to said first portion of projection data; and,
performing a second iterative reconstruction technique to reconstruct a second image in response to said second portion of projection data;
wherein said first iterative reconstruction technique is an Ordered Subset (OS) technique and said second iterative reconstruction technique is an iterative coordinate descent (ICD) technique.

26. The method of claim 25, wherein said first iterative reconstruction technique terminates based on a first criterion and said second iterative reconstruction technique terminates based on a second criterion.

* * * * *